US012675667B2

(12) United States Patent (10) Patent No.: US 12,675,667 B2
Lin et al. (45) Date of Patent: Jul. 7, 2026

(54) METHOD AND ELECTRONIC DEVICE OF UPDATING NEURAL NETWORK MODEL

(71) Applicant: Wistron Corporation, New Taipei City (TW)

(72) Inventors: Ying Chen Lin, New Taipei City (TW); Kun Han Li, New Taipei City (TW)

(73) Assignee: Wistron Corporation, New Taipei City (TW)

( * ) Notice: Subject to any disclaimer, the term of this patent is extended or adjusted under 35 U.S.C. 154(b) by 756 days.

(21) Appl. No.: 17/938,915

(22) Filed: Sep. 6, 2022

(65) Prior Publication Data

US 2023/0401421 A1 Dec. 14, 2023

(30) Foreign Application Priority Data

Jun. 8, 2022 (TW) .................................. 111121235

(51) Int. Cl.
 *G06N 20/00* (2019.01)
 *G06N 3/04* (2023.01)
 *G06N 3/08* (2023.01)
(52) U.S. Cl.
 CPC ................. *G06N 3/04* (2013.01); *G06N 3/08* (2013.01); *G06N 20/00* (2019.01)
(58) Field of Classification Search
 None
 See application file for complete search history.

(56) References Cited

U.S. PATENT DOCUMENTS

| | | | | |
|---|---|---|---|---|
| 2017/0286830 A1* | 10/2017 | El-Yaniv | .................. | G06F 7/48 |
| 2019/0212981 A1* | 7/2019 | Park | ......................... | G06N 3/04 |
| 2020/0005143 A1* | 1/2020 | Zamora Esquivel | .... | G06N 3/08 |
| 2020/0134460 A1* | 4/2020 | Du | ......................... | G06N 3/063 |
| 2021/0064985 A1* | 3/2021 | Sun | ......................... | G06N 3/08 |
| 2021/0287074 A1* | 9/2021 | Coenen | .................. | G11C 11/54 |

(Continued)

FOREIGN PATENT DOCUMENTS

| | | | | |
|---|---|---|---|---|
| CN | 110535486 A | * 12/2019 | .............. | G06N 3/08 |
| TW | 201933194 | 8/2019 | | |
| TW | 202139073 | 10/2021 | | |

OTHER PUBLICATIONS

"Office Action of Taiwan Counterpart Application", issued on Dec. 8, 2022, p. 1-p. 8.

*Primary Examiner* — Xuyang Xia
(74) *Attorney, Agent, or Firm* — JCIPRNET

(57) ABSTRACT

A method and an electronic device of updating a neural network model are provided. The method includes the following steps. The neural network model is received. The neural network model includes a first neuron and a second neuron. The training data is input to the first neuron to output a first estimated value from the second neuron. A first weight of the first neuron is quantized to generate a third neuron, and a second weight of the second neuron is quantized to generate a fourth neuron. The training data is input to the third neuron to output a second estimated value from the fourth neuron. A first activation function of the first neuron and a second activation function of the second neuron are updated according to the first estimated value and the second estimated value, thereby generating the updated neural network model. The updated neural network model is output.

16 Claims, 4 Drawing Sheets

(56)         References Cited

U.S. PATENT DOCUMENTS

| 2022/0121927 | A1* | 4/2022 | O'Connor | G06F 11/30 |
| 2022/0138562 | A1* | 5/2022 | Biryukova | G06F 17/12 |
| | | | | 706/15 |
| 2022/0366303 | A1* | 11/2022 | Hara | G06N 20/00 |
| 2023/0054706 | A1* | 2/2023 | Seki | G06N 3/045 |

* cited by examiner

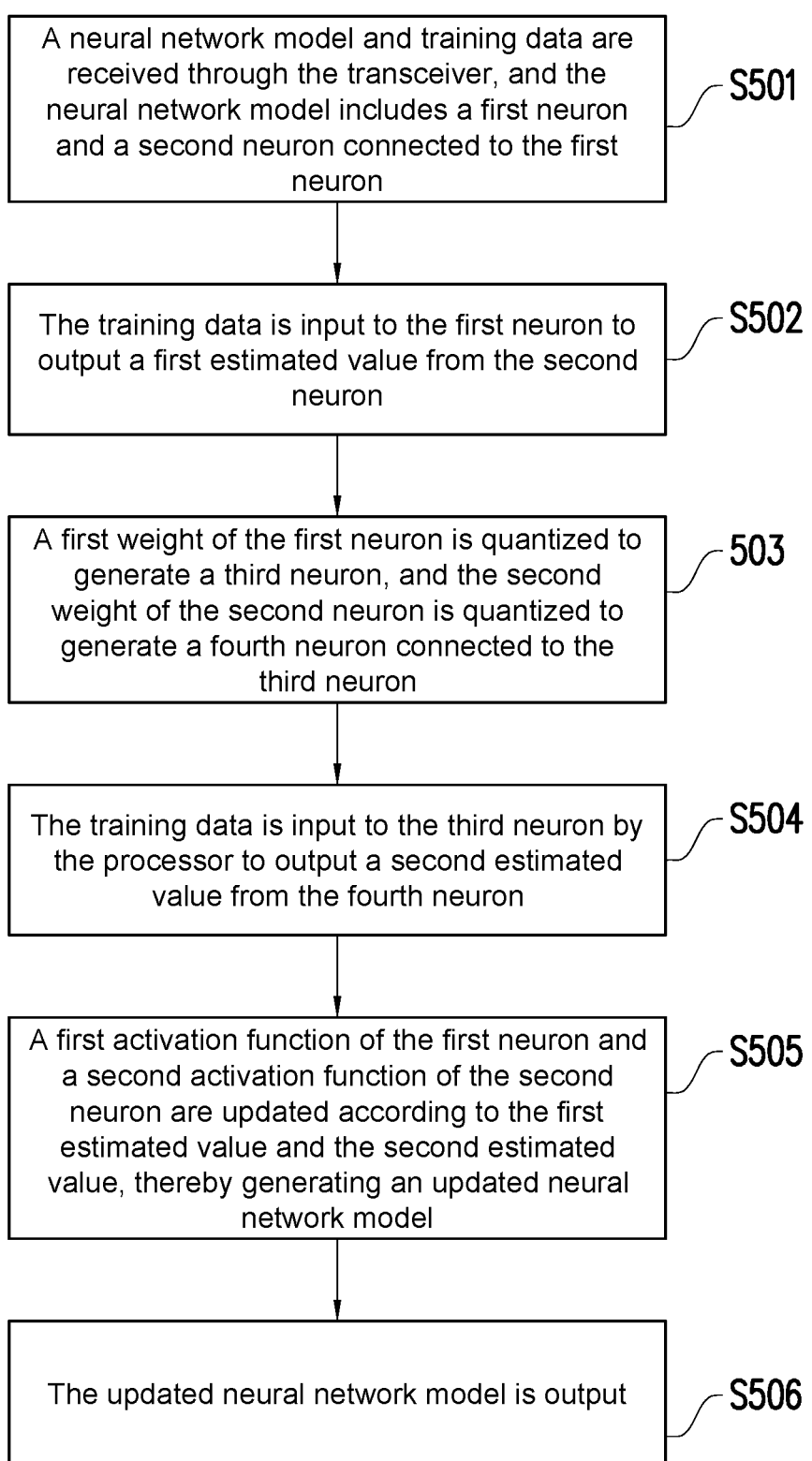

A neural network model and training data are received through the transceiver, and the neural network model includes a first neuron and a second neuron connected to the first neuron ⟋S501

The training data is input to the first neuron to output a first estimated value from the second neuron ⟋S502

A first weight of the first neuron is quantized to generate a third neuron, and the second weight of the second neuron is quantized to generate a fourth neuron connected to the third neuron ⟋503

The training data is input to the third neuron by the processor to output a second estimated value from the fourth neuron ⟋S504

A first activation function of the first neuron and a second activation function of the second neuron are updated according to the first estimated value and the second estimated value, thereby generating an updated neural network model ⟋S505

The updated neural network model is output ⟋S506

FIG. 5

METHOD AND ELECTRONIC DEVICE OF UPDATING NEURAL NETWORK MODEL

CROSS-REFERENCE TO RELATED APPLICATION

This application claims the priority benefit of Taiwan application serial no. 111121235, filed on Jun. 8, 2022. The entirety of the above-mentioned patent application is hereby incorporated by reference herein and made a part of this specification.

BACKGROUND

Technology Field

The disclosure relates to an artificial intelligence technology, and particularly, to a method and an electronic device of updating a neural network model.

Description of Related Art

At present, products assisting users in developing customized neural network models have been launched on the market. However, these products focus only on using heuristic methods to generate neural network models with better performance but ignore the problem of how to effectively reduce the complexity of neural network models. Therefore, the generated neural network models often work only on devices with high computing power. When the computing power is limited (e.g., running artificial intelligence models by edge computing devices), the neural network models may not run smoothly or the performance of the neural network models may be reduced.

However, if the traditional quantization method is used to quantize the neural network model to reduce the model complexity, the performance of the quantized neural network model may be affected by the quantization error accumulated layer by layer (e.g., the convolutional layer of the neural network model).

SUMMARY

The disclosure provides a method and an electronic device of updating a neural network model capable of generating new neurons by quantizing the weights of neurons in the neural network model and performing model order-reduction for the neural network model.

An electronic device of updating a neural network model of the disclosure includes a transceiver and a processor. The transceiver is configured for receiving the neural network model and a piece of training data, and the neural network model includes a first neuron and a second neuron connected to the first neuron. The processor is coupled to the transceiver, and the processor is configured to execute steps as follows. The training data is input to the first neuron to output a first estimated value from the second neuron. A first weight of the first neuron is quantized to generate a third neuron, and a second weight of the second neuron is quantized to generate a fourth neuron connected to the third neuron. The training data is input to the third neuron to output a second estimated value from the fourth neuron. A first activation function of the first neuron and a second activation function of the second neuron are updated according to the first estimated value and the second estimated value to generate an updated neural network model, and the transceiver is configured for outputting the updated neural network model.

A method of updating a neural network model of the disclosure is used in an electronic device with a transceiver and a processor and includes steps as follows. The neural network model and a piece of training data are received through the transceiver, and the neural network model includes a first neuron and a second neuron connected to the first neuron. The training data is input to the first neuron by the processor to output a first estimated value from the second neuron. A first weight of the first neuron is quantized to generate a third neuron, and a second weight of the second neuron is quantized to generate a fourth neuron connected to the third neuron. The training data is input to the third neuron to output a second estimated value from the fourth neuron. A first activation function of the first neuron and a second activation function of the second neuron are updated according to the first estimated value and the second estimated value to generate the updated neural network model, and the updated neural network model is output.

In summary, the electronic device of the disclosure may achieve the purpose of model reduction while maintaining the performance of the neural network model.

BRIEF DESCRIPTION OF THE DRAWING

FIG. 5 is a flowchart illustrating a method of updating a neural network model according to an embodiment of the disclosure.

DESCRIPTION OF THE EMBODIMENTS

Figure 1:
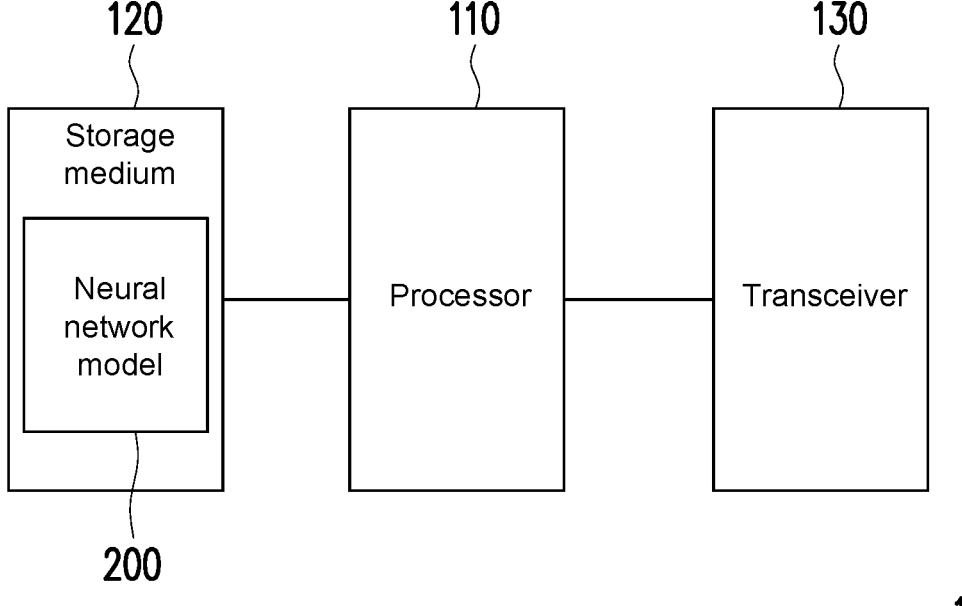
FIG. 1 is a schematic view of an electronic device according to an embodiment of the disclosure.

In order to make the content of the disclosure more comprehensible, embodiments are described below as examples that the disclosure is implemented accordingly. Moreover, wherever appropriate in the drawings and embodiments, elements/components/steps with the same reference numerals represent the same or similar parts.

FIG. 1 is a schematic view of an electronic device 100 according to an embodiment of the disclosure, and the electronic device 100 may be configured to update a neural network model to reduce the complexity of the neural network model. The electronic device 100 may include a processor 110, a storage medium 120, and a transceiver 130.

For example, the processor 110 is a central processing unit (CPU), or other programmable general purpose or special purpose micro control unit (MCU), a microprocessor, a digital signal processor (DSP), a programmable controller, a special application integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA), other similar elements, or a combination thereof. The processor 110 may be coupled to the storage medium 120 and the transceiver 130, and access and execute multiple modules and various application programs stored in the storage medium 120.

For example, the storage medium 120 is any type of fixed or removable random access memory (RAM), read-only memory (ROM), flash memory, hard disk drive (HDD), solid state drive (SSD), other similar elements, or a combination thereof, and the storage medium 120 is configured to store multiple modules or various application programs that may be executed by the processor 110. In one embodiment, the storage medium 120 may store a neural network model 200 to be updated received by the transceiver 130.

The transceiver 130 transmits and receives signals in a wireless or wired manner. The transceiver 130 may also perform operations, such as low noise amplification, impedance matching, frequency mixing, up or down frequency conversion, filtering, amplification, and the like.

Figure 2:
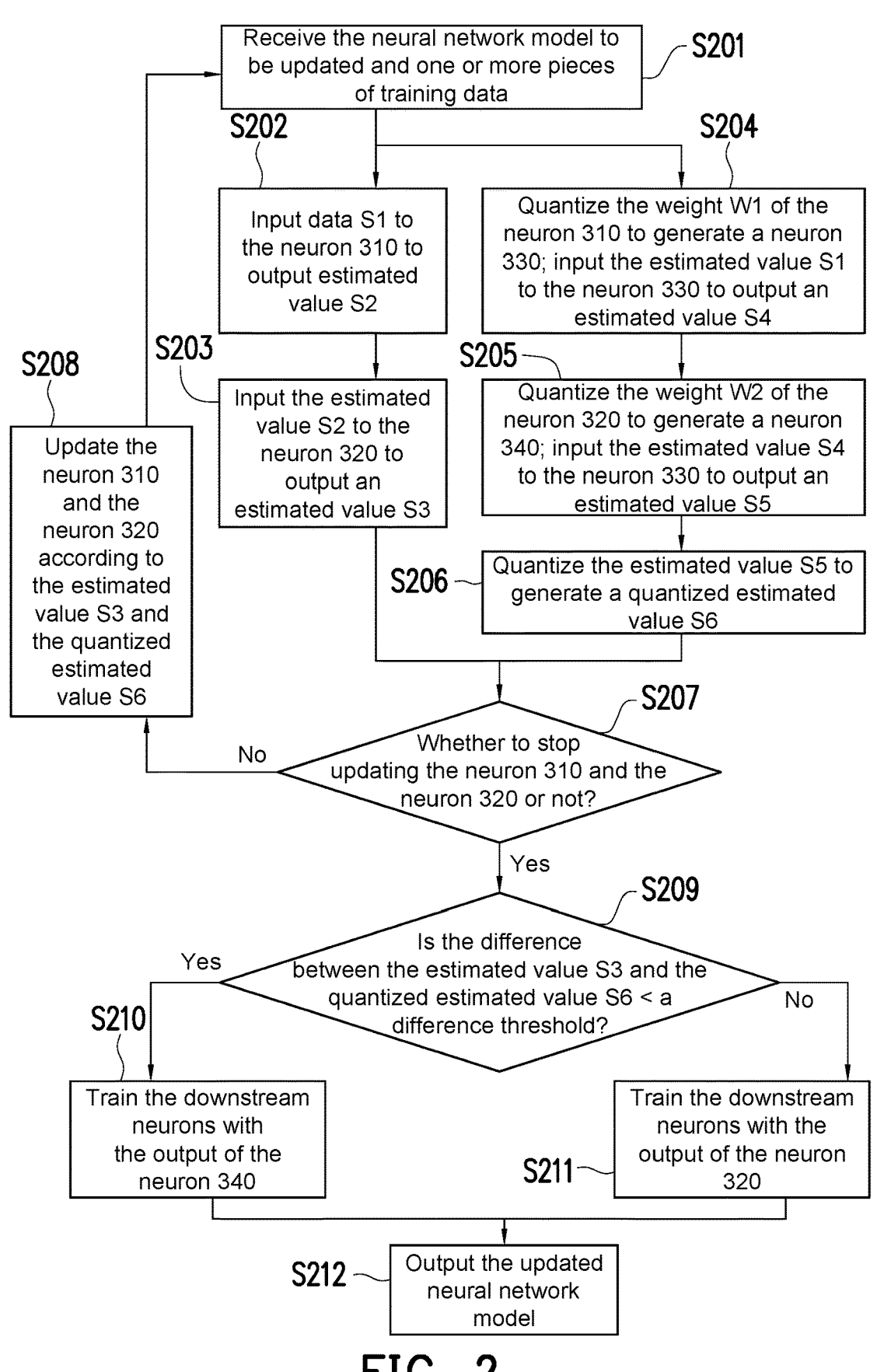
FIG. 2 is a flowchart illustrating a method of updating a neural network model according to an embodiment of the disclosure.

FIG. 2 is a flowchart illustrating a method of updating a neural network model according to an embodiment of the disclosure, and the method may be implemented by the electronic device 100 shown in FIG. 1. In step S201, the processor 110 may receive the neural network model 200 to be updated and one or more pieces of training data through the transceiver 130. The processor 110 may store the neural network model 200 or training data in the storage medium 120.

Figure 3:
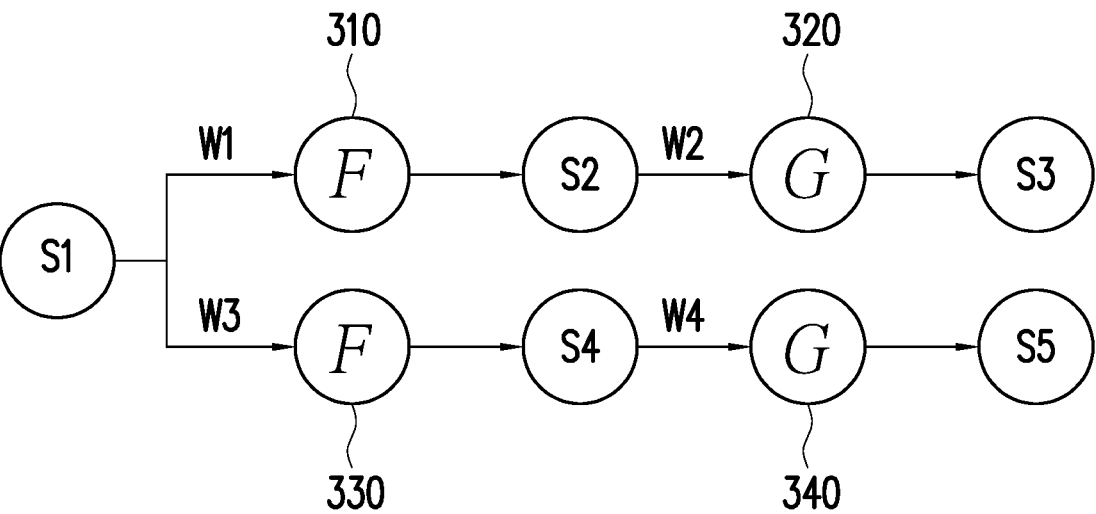
FIG. 3 is a schematic view illustrating an original neuron and a new neuron according to an embodiment of the disclosure.

The neural network model 200 includes at least two neurons, and each neuron has a corresponding weight and an activation function. FIG. 3 is a schematic view illustrating an original neuron and a new neuron according to an embodiment of the disclosure. Referring to FIG. 2 and FIG. 3, in one embodiment, the neural network model 200 includes original neurons at least, such as a neuron 310 and a neuron 320, the weight of the neuron 310 is W1 and the activation function is F, and the weight of the neuron 320 is W2 and the activation function is G. The neuron 320 may be a downstream neuron of the neuron 310. In other words, an input terminal of the neuron 320 may be connected to an output terminal of the neuron 310.

In step S202, the processor 110 may input data S1 to the neuron 310 to output an estimated value S2. More specifically, the processor 110 may input the product of the data S1 and the weight W1 into an activation function F of the neuron 310 to output the activation function value serving as the estimated value S2. The data S1 is, for example, the training data received by the transceiver 130 or the estimated value output by the upstream neuron of the neuron 310, and the output terminal of the upstream neuron may be connected to the input terminal of the neuron 310.

In one embodiment, the activation function F may be a piecewise function. Equation (1) is an example of the activation function F, but the disclosure is not limited thereto.

$$F(x) = \begin{cases} 1, x \geq 0 \\ 0, x < 0 \end{cases} \tag{1}$$

In step S203, the processor 110 may input the estimated value S2 to the neuron 320 to output an estimated value S3 (or referred to as a "first estimated value"). More specifically, the processor 110 may input the product of the estimated value S2 and the weight W2 to an activation function G of the neuron 320 to output the activation function value serving as the estimated value S3.

In one embodiment, the activation function G may be a piecewise function. Equation (2) is an example of the activation function G, but the disclosure is not limited thereto.

$$G(x) = \begin{cases} 1, x \geq 0 \\ 0, x < 0 \end{cases} \tag{2}$$

In step S204, the processor 110 may quantize the weight W1 of the neuron 310 to generate a neuron 330, a weight W3 of the neuron 330 is the quantized weight W1, and the activation function of the neuron 330 is the same as the activation function F of the neuron 310. For example, the weight W1 may correspond to a floating point number format, such as FP32. The processor 110 may quantize the floating point number format of the weight W1 into a floating point number format, such as FP16 or quantize the floating point number format of the weight W1 into an integer format, such as Int 8 or Int 4, thereby generating the weight W3.

After generating the neuron 330, the processor 110 may input the data S1 to the neuron 330 to output an estimated value S4. More specifically, the processor 110 may input the product of the data S1 and the weight W3 to the activation function F of the neuron 330 to output the activation function value serving as the estimated value S4.

In step S205, the processor 110 may quantize the weight W2 of the neuron 320 to generate a neuron 340. In one embodiment, the input terminal of the neuron 340 may be connected to the output terminal of the neuron 330. A neuron, such as the neuron 330 or the neuron 340, that does not exist in the original neural network model 200 may be referred to as a new neuron. The weight W4 of the neuron 340 is the quantized W2, and the activation function of the neuron 340 is the same as the activation function G of the neuron 320. For example, the weight W2 may correspond to a floating point number format, such as FP32. The processor 110 may quantize the floating point number format of the weight W2 into a floating point number format, such as FP16 or quantize the floating point number format of the weight W2 into an integer format, such as Int 8 or Int 4, thereby generating the weight W4.

After generating the neuron 340, the processor 110 may input the estimated value S4 to the neuron 330 to output an estimated value S5. More specifically, the processor 110 may input the product of the estimated value S4 and the weight W4 to the activation function G of the neuron 340 to output the activation function value serving as the estimated value S5.

Figure 4:
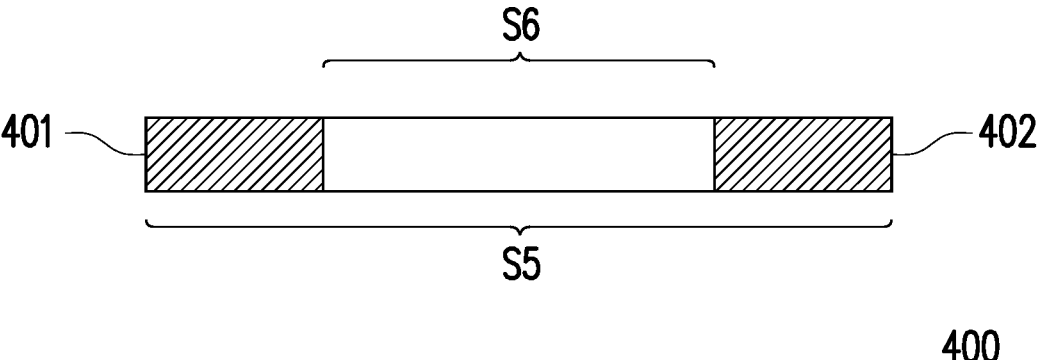
FIG. 4 is a schematic view illustrating a data type format of a quantized estimated value S5 according to an embodiment of the disclosure.

In step S206, the processor 110 may quantize the estimated value S5 to generate a quantized estimated value S6. FIG. 4 is a schematic view illustrating a data type format 400 of the quantized estimated value S5 according to an embodiment of the disclosure. The processor 110 may delete at least one bit in the data type format 400 of the estimated value S5 to generate the quantized estimated value S6, and the at least one bit may include the most significant bit and/or the least significant bit. For example, the processor 110 may delete the most significant i-bits 401 in the data type format 400 of the estimated value S5 and the least significant j-bits 402 to generate the quantized estimated value S6, where i or j is a positive integer. The most significant i-bits 401 may include the most significant bits, and the least significant j-bits may include the least significant bits.

Referring to FIG. 2, in step S207, the processor 110 may determine whether to stop updating the neuron 310 and the neuron 320. If the processor 110 determines to stop the updating of the neuron 310 or the neuron 320, then it proceeds to step S209. If the processor 110 determines not to stop the updating of the neuron 310 or the neuron 320, then it proceeds to step S208.

In one embodiment, the processor 110 may determine whether to stop updating the neuron 310 or the neuron 320 according to the number of times of iteration. Specifically, the storage medium 120 may pre-store a count value and a threshold of the number of iteration times, and the initial value of the count value may be 0. When proceeding to step S207, the processor 110 may increase the count value (e.g., an increase of 1 to the count value). Next, the processor 110 may determine whether the count value is greater than the threshold of the number of iteration times. If the count value is greater than the threshold of the number of iteration times, the processor 110 may determine to stop updating the neuron 310 or the neuron 320. If the count value is less than or equal to the threshold of the number of iteration times, the processor 110 may determine not to stop updating the neuron 310 or the neuron 320.

In one embodiment, the storage medium 120 may pre-store a difference threshold. The processor 110 may determine whether to stop updating the neuron 310 or the neuron 320 according to the difference between the estimated value S3 and the quantized estimated value S6. If the difference between the estimated value S3 and the quantized estimated value S6 is less than the difference threshold, the processor 110 may determine to stop updating the neuron 310 or the neuron 320. If the difference between the estimated value S3 and the quantized estimated value S6 is greater than or equal to the difference threshold, the processor 110 may determine not to stop updating the neuron 310 or the neuron 320.

In step S208, the processor 110 may update the neuron 310 and the neuron 320 according to the estimated value S3 and the quantized estimated value S6, thereby updating the neural network model 200.

In one embodiment, the processor 110 may update the activation function F of the neuron 310 or the activation function G of the neuron 320 according to the gradient descent method, so as to update the neural network model 200, and the gradient used in the gradient descent method may be derived by the processor 110 according to the estimated value S3 and the quantized estimated value S6.

In one embodiment, the processor 110 may update the weight W1 of the neuron 310 according to Equation (3) to update the neural network model 200, where W1' is the updated weight W1.

$$W1' = \text{sign}\,(W1) = \begin{cases} 1, \text{if } W1 \geq 0 \\ -1, \text{if } W1 < 0 \end{cases} \quad (3)$$

In one embodiment, the processor 110 may update the weight W2 of the neuron 320 according to equation (4), thereby updating the neural network model 200, where W2' is the updated weight W2.

$$W2' = \text{sign}\,(W2) = \begin{cases} 1, \text{if } W2 \geq 0 \\ -1, \text{if } W2 < 0 \end{cases} \quad (4)$$

In step S209, the processor 110 may calculate the difference between the estimated value S3 and the quantized estimated value S6 and determine whether the difference is less than a difference threshold pre-stored in the storage medium 120. If the difference is less than the difference threshold, proceed to step S210. If the difference is greater than or equal to the difference threshold, proceed to step S211. Note that the difference threshold illustrated in step S209 may be the same as or different from the difference threshold illustrated in step S207.

The difference between the estimated value S3 and the quantized estimated value S6 is less than the difference threshold, indicating that the estimated value output by the neuron 330 or the neuron 340 is reliable. Therefore, in step S210, the processor 110 may train the downstream neuron (i.e., the neuron whose input terminal is connected to the output terminal of the neuron 320) with the output of the neuron 340 (rather than the output of the neuron 320). The processor 110 may train the downstream neuron according to the same flow illustrated in FIG. 2, thereby updating the neural network model 200.

In step S211, the processor 110 may train the downstream neuron of the neuron 320 with the output of the neuron 320. The processor 110 may train the downstream neuron according to the same flow illustrated in FIG. 2, thereby updating the neural network model 200. The weight W4 of the neuron 340 or the weight W3 of the neuron 330 is quantized compared to the weight W2 of the neuron 320 or the weight W1 of the neuron 310. Therefore, compared to training the downstream neuron with the output of the neuron 320, training the downstream neuron with the output of the neuron 340 may significantly reduce the computational burden of the electronic device 100.

In step S212, the processor 110 may output the updated neural network model 200 through the transceiver 130. Compared to the original neural network model 200, the updated neural network model 200 has lower complexity and is more adapted for devices with limited computing power.

In one embodiment, the updated neural network model 200 output by the processor 110 may include only the updated original neuron (e.g., the neuron 310 or the neuron 320) rather than the new neuron (e.g., the neuron 330 or the neuron 340).

FIG. 5 is a flowchart illustrating a method of updating a neural network model according to an embodiment of the disclosure, and the method may be implemented by the electronic device 100 shown in FIG. 1. In step S501, a neural network model and training data are received through the transceiver, and the neural network model includes a first neuron and a second neuron connected to the first neuron. In step S502, the training data is input to the first neuron to output the first estimated value from the second neuron. In step S503, the first weight of the first neuron is quantized to generate a third neuron, and the second weight of the second neuron is quantized to generate a fourth neuron connected to the third neuron. In step S504, the training data is input to the third neuron by the processor to output the second estimated value from the fourth neuron. In step S505, the first activation function of the first neuron and the second activation function of the second neuron are updated according to the first estimated value and the second estimated value, thereby generating an updated neural network model. In step S506, the updated neural network model is output.

In summary, the electronic device of the disclosure may generate new neurons by quantizing the weights of the neurons in the neural network model. The estimation results of the original neuron and the new neuron on the training data may be used to dynamically update the activation function or the weight of the neuron, thereby improving the performance of each neuron when the weight is quantized. If the performance of the new neuron is as expected, the neural network model may train a downstream neuron with the output of the new neuron, thereby completing the update of the neural network model. Accordingly, the electronic device may achieve the purpose of model reduction while maintaining the performance of the neural network model.

What is claimed is:

1. An electronic device of updating a neural network model, comprising:

a transceiver for receiving the neural network model and training data, wherein the neural network model comprises an input node, a first neuron connected to the input node, and a second neuron connected to the first neuron; and a processor coupled to the transceiver, wherein the processor is configured to execute:

inputting the training data from the input node to the first neuron to output a first value and inputting the first value to the second neuron to output a first estimated value from the second neuron;

quantizing a first weight of the first neuron to generate a third neuron different from the first neuron, and quantizing a second weight of the second neuron to generate a fourth neuron connected to the third neuron, wherein the first weight corresponds to a first floating point number format, and the quantized first weight corresponds to one of an integer format or a second floating point number format different from the first floating point number format, wherein the third neuron is connected to the input node;

inputting the training data from the input node to the third neuron to output a second value and inputting the second value to the fourth neuron to output a second estimated value from the fourth neuron;

updating a first activation function of the first neuron and a second activation function of the second neuron according to the first estimated value and the second estimated value to generate an updated neural network model, wherein the transceiver is configured for outputting the updated neural network model;

quantizing the second estimated value to generate a quantized second estimated value;

calculating a difference between the first estimated value and the quantized second estimated value; and training a downstream neuron of the second neuron with an output of the fourth neuron in response to the difference being less than a threshold.

2. The electronic device of updating the neural network model according to claim 1, wherein the processor is further configured to execute:

deleting one bit of the second estimated value to generate the quantized second estimated value; and updating the first activation function and the second activation function according to the first estimated value and the quantized second estimated value.

3. The electronic device of updating the neural network model according to claim 2, wherein the bit comprises at least one of a most significant bit and a least significant bit.

4. The electronic device of updating the neural network model according to claim 1, wherein the processor is further configured to execute:

deleting one bit of the second estimated value to generate the quantized second estimated value.

5. The electronic device of updating the neural network model according to claim 4, wherein the processor is further configured to execute:

training the downstream neuron with an output of the second neuron in response to the difference being greater than or equal to the threshold.

6. The electronic device of updating the neural network model according to claim 1, wherein the first activation function is a piecewise function.

7. The electronic device of updating the neural network model according to claim 1, further comprising:

a storage medium coupled to the processor and configured for storing the neural network model.

8. The electronic device of updating the neural network model according to claim 1, further comprising:

a storage medium coupled to the processor for storing a threshold of a number of iteration times, wherein the processor determines whether to stop updating the neural network model according to the threshold of the number of the iteration times.

9. A method of updating a neural network model for an electronic device having a transceiver and a processor, comprising:

receiving the neural network model and training data through the transceiver, wherein the neural network model comprises an input node, a first neuron connected to the input node, and a second neuron connected to the first neuron;

inputting the training data from the input node to the first neuron by the processor to output a first value and inputting the first value to the second neuron output a first estimated value from the second neuron;

quantizing a first weight of the first neuron to generate a third neuron different from the first neuron, and quantizing a second weight of the second neuron to generate a fourth neuron connected to the third neuron, wherein the first weight corresponds to a first floating point number format, and the quantized first weight corresponds to one of an integer format or a second floating point number format different from the first floating point number format, wherein the third neuron node is connected to the input node;

inputting the training data from the input node to the third neuron to output a second value and inputting the second value to the fourth neuron to output a second estimated value from the fourth neuron;

updating a first activation function of the first neuron and a second activation function of the second neuron according to the first estimated value and the second estimated value to generate the updated neural network model;

outputting the updated neural network model;

quantizing the second estimated value to generate a quantized second estimated value;

calculating a difference between the first estimated value and the quantized second estimated value; and training a downstream neuron of the second neuron with an output of the fourth neuron in response to the difference being less than a threshold.

10. The method of updating the neural network model for the electronic device according to claim 9, wherein the step of updating the first activation function of the first neuron and the second activation function of the second neuron according to the first estimated value and the second estimated value to generate the updated neural network model comprises:

deleting one bit of the second estimated value to generate a quantized second estimated value; and updating the first activation function and the second activation function according to the first estimated value and the quantized second estimated value.

11. The method of updating the neural network model for the electronic device according to claim 10, wherein the bit comprises at least one of a most significant bit and a least significant bit.

12. The method of updating the neural network model for the electronic device according to claim 9, further comprising:

deleting one bit of the second estimated value to generate the quantized second estimated value.

13. The method of updating the neural network model for the electronic device according to claim 12, further comprising:

training the downstream neuron with an output of the second neuron in response to the difference being greater than or equal to the threshold.

14. The method of updating the neural network model for the electronic device according to claim 9, wherein the first activation function is a piecewise function.

15. The method of updating the neural network model for the electronic device according to claim 9, wherein the electronic device further comprises a storage medium, wherein the storage medium stores the neural network model.

16. The method of updating the neural network model for the electronic device according to claim 9, wherein the electronic device further comprises a storage medium, wherein the storage medium stores a threshold of a number of iteration times, wherein the processor determines whether to stop updating the neural network model according to the threshold of the number of the iteration times.

\* \* \* \* \*